United States Patent
Fure

(10) Patent No.: US 7,073,023 B2
(45) Date of Patent: Jul. 4, 2006

(54) METHOD FOR MINIMIZING RAID 0 DATA TRANSFER RATE VARIABILITY

(75) Inventor: Jan Fure, Milwaukie, OR (US)

(73) Assignee: LSI Logic Corporation, Milpitas, CA (US)

( * ) Notice: Subject to any disclaimer, the term of this patent is extended or adjusted under 35 U.S.C. 154(b) by 415 days.

(21) Appl. No.: 10/430,529

(22) Filed: May 5, 2003

(65) Prior Publication Data

US 2004/0225833 A1    Nov. 11, 2004

(51) Int. Cl.
*G06F 12/00* (2006.01)

(52) U.S. Cl. ...................................... 711/114
(58) Field of Classification Search ................. 711/135
See application file for complete search history.

(56) References Cited

U.S. PATENT DOCUMENTS

| | | | |
|---|---|---|---|
| 5,680,550 A * | 10/1997 | Kuszmaul et al. ............ 712/11 |
| 6,591,339 B1 * | 7/2003 | Horst et al. .................. 711/114 |
| 6,970,966 B1 * | 11/2005 | Gemelli et al. ............. 710/305 |
| 2002/0073298 A1 * | 6/2002 | Geiger et al. ................ 711/206 |
| 2004/0148468 A1 * | 7/2004 | Hooker ........................ 711/132 |
| 2004/0193788 A1 * | 9/2004 | Barth et al. .................. 711/105 |
| 2005/0286081 A1 * | 12/2005 | Unno ......................... 358/1.15 |

* cited by examiner

*Primary Examiner*—Mano Padmanabhan
*Assistant Examiner*—Gregory Hein
(74) *Attorney, Agent, or Firm*—Cochran Freund & Young LLC

(57) ABSTRACT

A RAID 0 disk array has an optimizing algorithm for allocating the amount of data stored to each drive in a disk array. The algorithm allocates a proportion of the data for each stripe to the various disk drives based at least in part on the data transfer rate for each drive. The disk array may be constructed such that about half of the disk drives write to the outside tracks of the drives while the remaining disks write to the inside tracks. Using the algorithm, the minimum data transfer rate for the disk array may be maximized.

12 Claims, 3 Drawing Sheets

100
RAID SYSTEM

US 7,073,023 B2

METHOD FOR MINIMIZING RAID 0 DATA TRANSFER RATE VARIABILITY

BACKGROUND OF THE INVENTION a. Field of the Invention

The present invention pertains to computer memory storage devices and specifically to storage devices using RAID 0 architecture.

b. Description of the Background

Hard disk storage devices have certain inherent variability in data transfers due to the geometry of the disk platter. On tracks near the outside of the disk, data transfer rates may be much higher than data transfer rates for tracks on the inside. This is due to the fact that the speed with which the heads ride over the disk changes in proportion to the radius of the track location.

In a RAID 0 disk array, several disk drives are operated in parallel. When a data block is written to the array, the data may be written in 'stripes' wherein the data is divided among the various disk drives and written substantially simultaneously.

The performance of a RAID 0 array may be adversely affected by the data transfer rates of the various disk drives that make up the array. For example, when a stripe is written to an array, if all of the disk drives write to the outside tracks, the performance will be very good. When a stripe is written to the same array and all of the disk drives write to inside tracks, the performance may be much lower.

The performance specifications of a RAID 0 array may include a minimum data transfer rate. Such a rate will be dictated by the performance of the array when writing a stripe to the inside tracks of all of the disk drives simultaneously.

It may therefore be advantageous to provide a RAID 0 array wherein the variability of the data transfer rate may be less than standard RAID 0 arrays. It may be further advantageous to provide a RAID 0 array with a minimum data transfer rate that is higher than other RAID 0 arrays that are configured with the same disk drives.

SUMMARY OF THE INVENTION

The present invention overcomes the disadvantages and limitations of the prior art by providing a system and method for optimizing the data transfer rate for a RAID 0 disk array by allocating the amount of data stored on each disk of the array based upon the data transfer rate of each disk in the array. The RAID 0 disk array may be constructed so that about half of the drives begin writing to the outer tracks of the disk while the other half of the drives begin writing to the inner tracks of the disk. An algorithm allocates different amounts of data to each disk drive in a stripe approximately proportional to the data transfer rate of the drive for that particular stripe.

The present invention may therefore comprise a method of storing data on a disk array comprising: providing a plurality of disk drives; determining a stripe of data to write to the disk array; for each of the plurality of disk drives, determining the approximate data transfer rate for each of the plurality of disk drives; for each of the plurality of disk drives, allocating a portion of the stripe of data to each of the plurality of disk drives based on the approximate data transfer rate for each of the plurality of disk drives; and for each of the plurality of disk drives, writing the portion of the stripe of data allocated to the each of the plurality of disk drives.

The present invention may further comprise a disk array for storing data comprising: a plurality of disk drives; a controller adapted to determining a stripe of data to write to the disk array, the controller being further adapted to determine the approximate data transfer rate for each of the plurality of disk drives and allocating a portion of the stripe of data to each of the plurality of disk drives based upon the approximate data transfer rate for each of the plurality of disk drives, the controller further adapted to writing the portion of the stripe of data allocated to the each of the plurality of disk drives to the each of the plurality of disk drives.

The advantages of the present invention are that the data transfer rate of a RAID 0 stripe is maximized. When the RAID 0 array is constructed with half of the disk drives writing on the outside tracks and half writing on the inside tracks, the minimum data transfer rate is substantially higher than a conventional RAID 0 array using the same disk drives.

BRIEF DESCRIPTION OF THE INVENTION

DETAILED DESCRIPTION OF THE INVENTION

Figure 1:
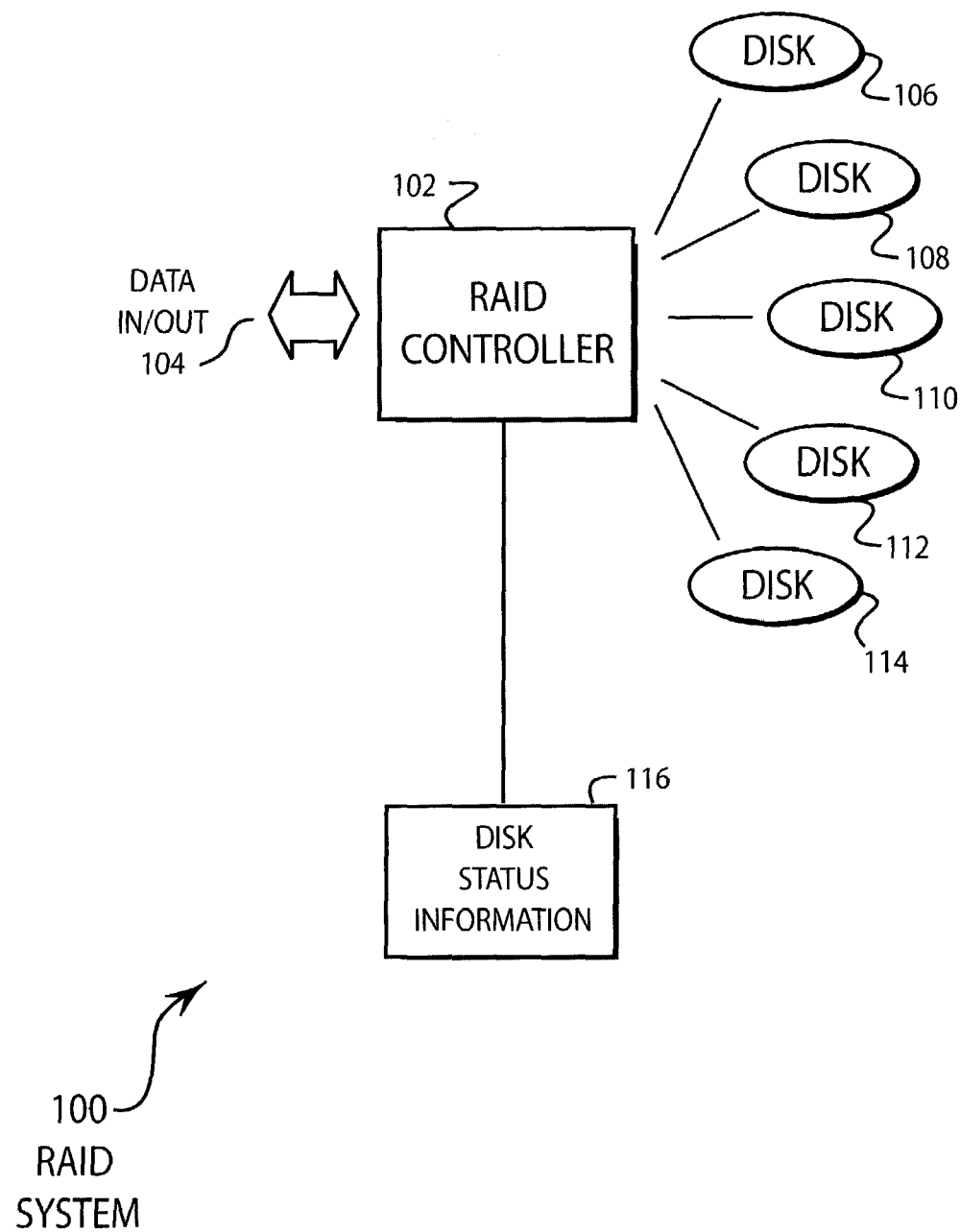
FIG. 1 is an illustration of an embodiment of the present invention of a RAID 0 system.

FIG. 1 illustrates an embodiment 100 of the present invention of a RAID system. A RAID controller 102 receives and sends data 104. The RAID controller 102 controls disks 106, 108, 110, 112, and 114. The RAID controller 102 may maintain the disk status information 116.

As is common practice in RAID 0 systems, the data that is received is divided amongst the various disk drives and simultaneously written to all of the disk drives. By writing a portion of the data to each drive simultaneously, the maximum data transfer rate of the system is approximately equal to the data transfer rate of the individual disk drives multiplied by the number of disk drives. The data that is written to all of the disk drives is known as a data slice.

The disk drives 106, 108, 110, 112, and 114 have the characteristic that the data transfer rate varies based on the track location to which the drive writes. When writing to tracks near the outside of the disk, the data transfer rate is relatively high. Conversely, when writing to tracks near the center of the disk, the data transfer rate is relatively low.

The RAID controller 102 has the ability to maximize the data transfer rate by allocating the data for a write operation to the various disk drives based on their particular data transfer rate for that operation. In order to perform this function, the RAID controller 102 may keep a pointer for the next write location for each disk drive in the disk status information 106. By knowing the location of the write action for a particular disk drive, the RAID controller 102 may calculate the data transfer rate for that drive on that particular write operation. The RAID controller 102 may use other methods to determine the approximate data transfer rate for each disk drive. For example, the RAID controller 102 may query each disk drive or perform a test of each disk drive prior to the write command. In other embodiments, the RAID controller 102 may measure and store the actual data transfer rate of the last write operation for each disk drive.

The RAID controller 102 may proportion the data blocks to be written to the various drives based on their data rate. A disk with a higher data transfer rate may be allocated a larger amount of data to be written during a particular data slice. A disk with a lower data transfer rate may be allocated a smaller amount of the data for the data slice. In this manner, the overall data transfer rate of the entire system can be maximized, since the speed is not gated by the slowest disk drive.

The RAID controller 102 may be a dedicated controller adapted to handle the input and output of data to an array of disks. In other embodiments, the RAID controller 102 may be a software program that is executed by a central processing unit of a computer. Those skilled in the art will appreciate that various processor and controller architectures may be used while keeping within the spirit and intent of the present invention.

For example, assume that disks 106, 110, and 114 have a data transfer rate of 200 KB/sec while disks 108 and 112 have a data transfer rate of 100 KB/sec. In order to write an 800 KB data slice, 200 KB would each be assigned to disks 106, 110, and 114 while only 100 KB would be assigned to disks 108 and 112. In this manner, all of the disks can begin and end writing their portion of the data slice substantially simultaneously. Using this example, one second would be required to write 800 KB. Those skilled in the art will appreciate that the numbers used in this example are exemplary only and are used to illustrate principles of the invention. They are not intended to limit the invention in any manner.

Figure 2:
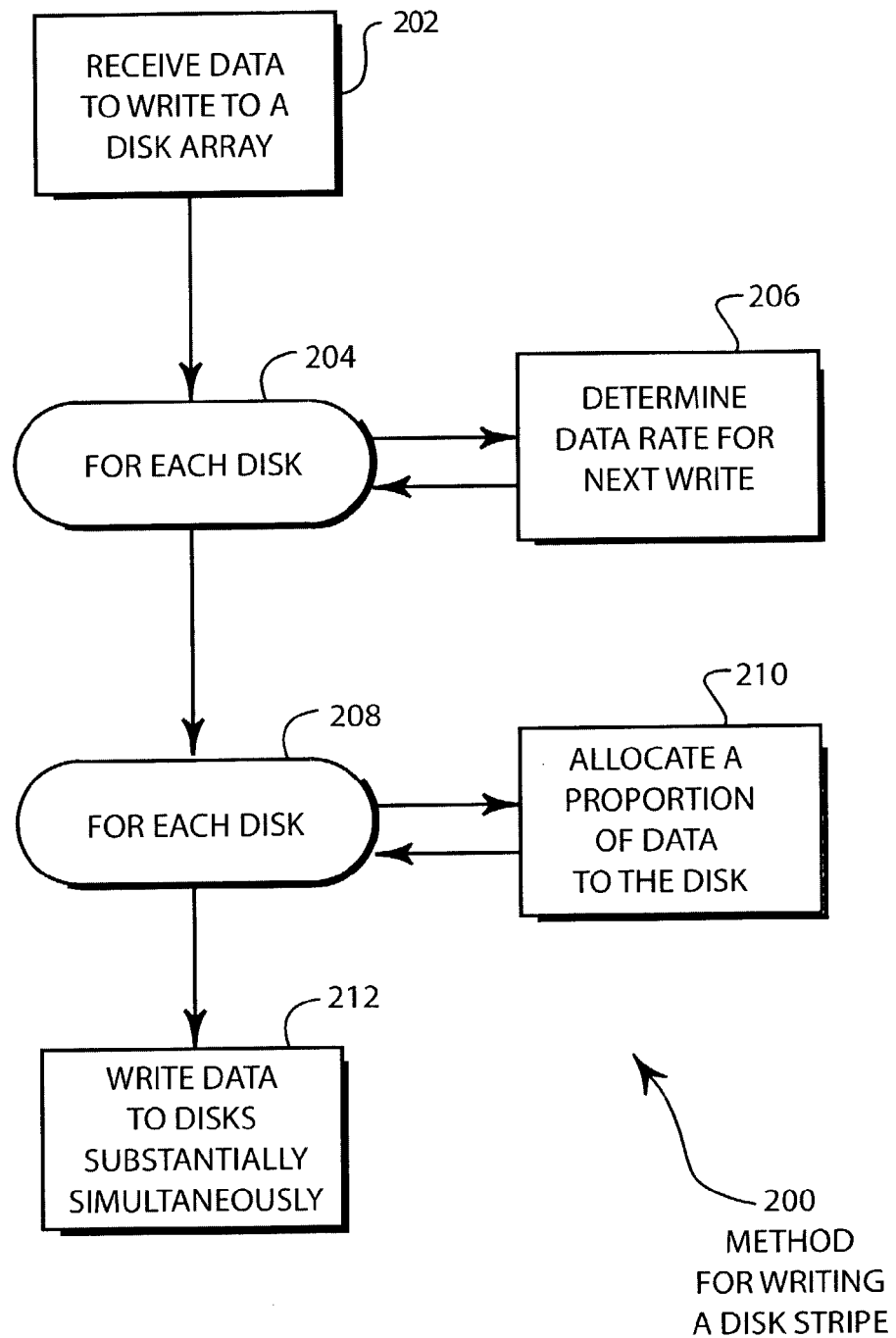
FIG. 2 is a work flow diagram of an embodiment of the present invention of a method for writing a disk stripe in a RAID 0 system.

FIG. 2 illustrates an embodiment 200 of a method for writing a disk stripe. The data is received by the RAID controller in block 202. For each disk in block 204, the data rate is determined for the next write operation in block 206. For each disk in block 208, a proportion of the data is allocated to each disk in block 210. The data is written to the drives substantially simultaneously in block 212.

The data rate for each disk drive in block 204 may be determined by calculating the approximate data rate based on the track number that will be used by the disk drive. A track number pointer may be stored in the controller memory and referenced for the operation of block 206. The data transfer rates for each disk drive may be a gross approximation or may be a very precise measurement.

In other embodiments, the data rate for each disk drive in block 206 may be determined by querying each disk drive individually. The drives may perform a short write operation to test the actual data transfer rate. In still other embodiments, the disk drive may have a controller that may by queried by the RAID controller to determine the data transfer rate.

The allocation of the data in block 210 may be proportioned based on the approximate data transfer rate. Other factors for data transfer overhead may be included in the actual calculation of the proportions of data allocated to each disk drive. Those skilled in the arts may use various factors in addition to the data transfer rates of the individual disk drives while keeping within the scope and intent of the present invention.

The data transfer rate determined in block 206 may be the data transfer rate for reading the disk drives, for writing to the disk drives, or for other performance standards. By using the data transfer rate for reading the disk drives, a stripe may be written to the disk array so that the read operation may be optimized. Conversely, by using the data transfer rate for writing to the disk drives, a stripe may be written to the disk array so that the write operation may be optimized. In some cases, the read and write data transfer rates of the disk drives may be substantially different and may yield different allocations of data to the various disk drives. Those skilled in the arts will appreciate that various parameters may be used to optimize the overall data transfer rate of the RAID 0 system using the present invention.

Figure 3:
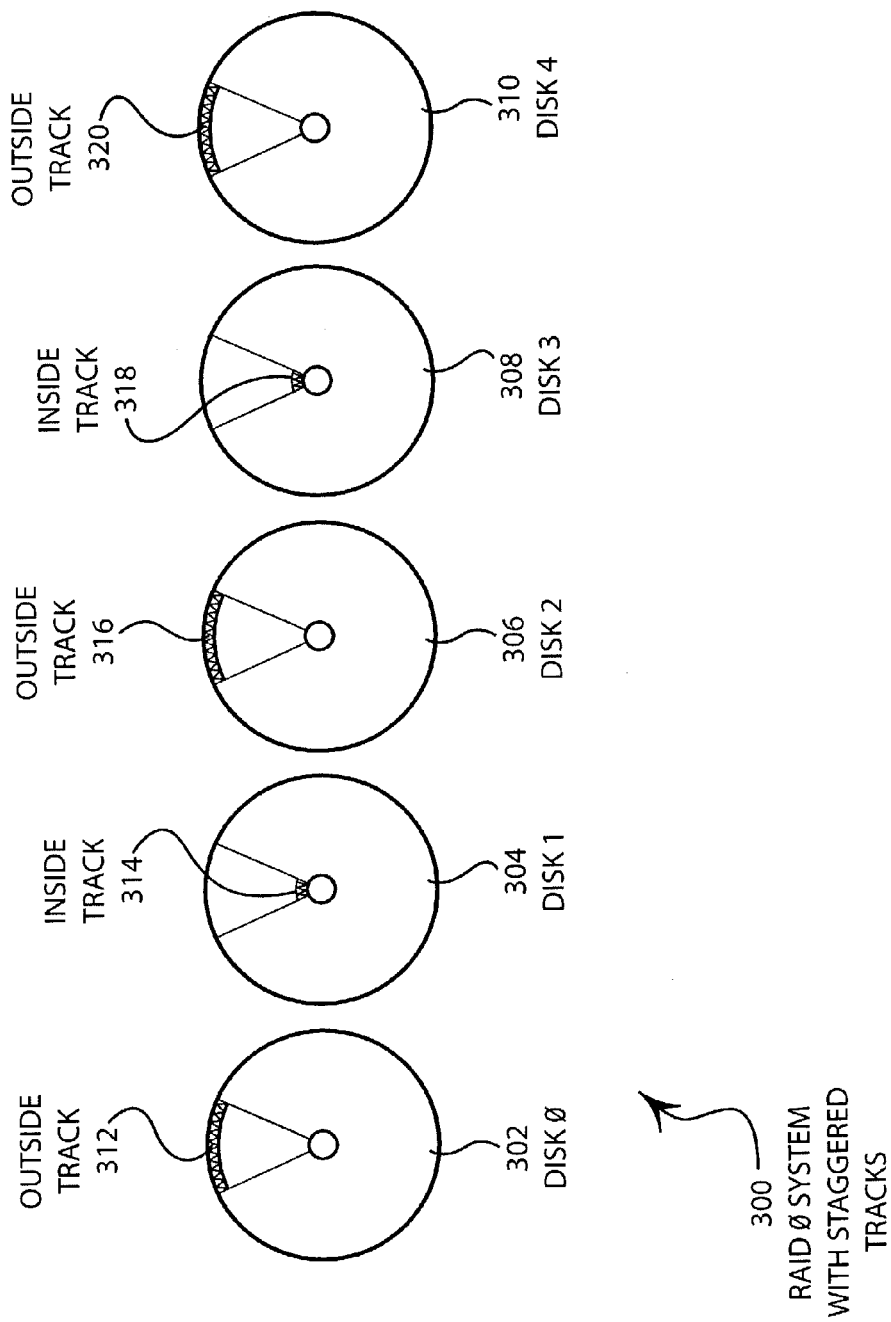
FIG. 3 illustrates an embodiment of the present invention of a RAID 0 system with staggered tracks.

FIG. 3 Illustrates an embodiment 300 of the present Invention of a RAID 0 system with staggered tracks. Disks 302, 308, and 310 are arranged such that the first tracks that are written are outside tracks 312, 316, and 320. Disks 304 and 308 are arranged such that the first tracks that are written are inside tracks 314 and 318.

The embodiment 300 when used in conjunction with the method 200 illustrated in FIG. 2 may result in a RAID 0 system with reduced variability in data transfer rate. Further, the lowest data transfer rate may be substantially higher than if the embodiment were configured to write to the same tracks of each disk drive.

Using the example illustrated in the discussion of FIG. 1, disks 302, 306, and 310 may be able to write at 200 KB/sec while disks 304 and 308 may be able to write at 100 KB/sec. By allocating an 800 KB stripe as 200 KB to each of disks 302, 306, and 310 and 100 KB each to disks 304 and 308, an overall data transfer rate of 800 KB/sec is achieved.

The lowest data transfer rate would occur when disks 302, 306, and 310 are able to write at 100 KB/sec while disks 304 and 308 are able to write at 200 KB/sec. In such a case, the overall data transfer rate would be approximately 700 KB/sec. If all of the disks were configured to write to the same tracks simultaneously, the minimum data transfer rate would calculate to be 500 KB/sec.

The minimum data transfer rate for a RAID 0 system is a critical parameter that is used to compare different RAID 0 systems. By using the inventive staggered disk drive RAID 0 system, an improved minimum data transfer rate may be achieved by using the same disk drive hardware.

The disks used for a staggered track RAID 0 system may be any number. In some embodiments, the number of disks may be as few as two and as high as may be desired. In order to achieve the maximum benefit of the staggered track configuration, an even number of disk drives may be desired. However, odd numbers of disk drives may be used by those skilled in the arts. In such cases, approximately half of the disk drives would be configured to begin writing to the outside tracks and the remainder would be configured to begin writing to the inside tracks.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of storing data on a disk array comprising:
providing a plurality of disk drives;
determining a stripe of data to write to said disk array;
determining the approximate data transfer rate of each of said disk drives of said plurality of disk drives;

allocating a portion of said stripe of data to each of said disk drives of said plurality of disk drives approximately proportional to the approximate data transfer rate of each of said disk drives of said plurality of disk drives; and writing said portion of said stripe of data allocated to each of said disk drives of said plurality of disk drives such that said allocated portion of said stripe of data is written substantially simultaneously to each of said disk drives of said plurality of disk drives.

2. The method of claim 1 further comprising arranging said plurality of disk drives such that about half of said plurality of disk drives are operable to preferentially write to outer tracks and the remainder of said plurality of disk drives are operable to preferentially write to inner tracks.

3. The method of claim 1 wherein said determining said approximate data transfer rate for each of said plurality of disk drives comprises determining a track number and using said track number to determine said data transfer rate.

4. The method of claim 1 wherein said determining said approximate data transfer rate for each of said plurality of disk drives comprises measuring said data transfer rate for each of said plurality of disk drives.

5. The method of claim 1 wherein said data transfer rate is based at least in part on the data transfer rate for writing to said each of said plurality of disk drives.

6. The method of claim 1 wherein said data transfer rate is based at least in part on the data transfer rate for reading from said each of said plurality of disk drives.

7. A disk array for storing data comprising:
a plurality of disk drives; and
a controller adapted to determining a stripe of data to write to said disk array, determining the approximate data transfer rate of each of said disk drives of said plurality of disk drives, allocating a portion of said stripe of data to each of said disk drives of said plurality of disk drives approximately proportional to the approximate data transfer rate of each of said plurality of disk drives, and writing said portion of said stripe of data allocated to each of said disk drives of said plurality of disk drives such that the allocated portion of said stripe of data is written substantially simultaneously to each of said disk drives of said plurality of disk drives.

8. The disk array of claim 7 wherein said plurality of disk drives are arranged such that about half of said plurality of disk drives are operable to preferentially write to outer tracks and the remainder of said plurality of disk drives are operable to preferentially write to inner tracks.

9. The disk array of claim 7 wherein said controller is further adapted to determine said approximate data transfer rate for each of said plurality of disk drives by determining a track number and using said track number to determine said data transfer rate.

10. The disk array of claim 7 wherein said controller is further adapted to determine said approximate data transfer rate for each of said plurality of disk drives by measuring said data transfer rate for each of said plurality of disk drives.

11. The disk array of claim 7 wherein said data transfer rate is based at least in part on the data transfer rate for writing to said each of said plurality of disk drives.

12. The disk array of claim 7 wherein said data transfer rate is based at least in part on the data transfer rate for reading from said each of said plurality of disk drives.

* * * * *